United States Patent [19]

Freiwald

[11] Patent Number: 4,746,128
[45] Date of Patent: May 24, 1988

[54] CASSETTE SHAFT SEAL

[75] Inventor: Gerhard Freiwald, Hemsbach, Fed. Rep. of Germany

[73] Assignee: Firma Carl Freudenberg, Weinheim/Bergstr., Fed. Rep. of Germany

[21] Appl. No.: 60,508

[22] Filed: Jun. 11, 1987

[30] Foreign Application Priority Data

Nov. 11, 1986 [DE] Fed. Rep. of Germany ....... 3638515

[51] Int. Cl.$^4$ .............................................. F16J 15/32
[52] U.S. Cl. ....................................... 277/45; 277/68; 277/152
[58] Field of Search ............................. 277/35, 44–46, 277/67–69, 134, 152, 153

[56] References Cited

U.S. PATENT DOCUMENTS

| | | | |
|---|---|---|---|
| 4,278,260 | 7/1981 | Brown | 277/152 X |
| 4,440,401 | 4/1984 | Olschewski et al. | 277/152 X |
| 4,522,411 | 6/1985 | Burgan | 277/134 |

FOREIGN PATENT DOCUMENTS

| | | | |
|---|---|---|---|
| 813226 | 9/1951 | Fed. Rep. of Germany | 277/153 |
| 3527991 | 8/1986 | Fed. Rep. of Germany | 277/152 |
| 1437899 | 3/1966 | France | 277/134 |
| 687430 | 2/1953 | United Kingdom | 277/35 |
| 1251329 | 10/1971 | United Kingdom | 277/153 |

Primary Examiner—Robert S. Ward
Attorney, Agent, or Firm—Felfe & Lynch

[57] ABSTRACT

A cassette shaft seal in which the outer ring (3) and the inner ring (11) have an opposite angular profile and together enclose an annular space (5) of substantially rectangular cross section. This annular space is bounded by an outwardly projecting flange (8) of the inner ring (11), which revolves together with the shaft that is to be sealed. The gap remaining between the flange (8) and the outside ring (3) is expanded in cross section by segmental cutouts uniformly distributed around the circumference, through which, under normal operating conditions, the volume of liquid contained in the annular space (5) is constantly renewed.

5 Claims, 2 Drawing Sheets

CASSETTE SHAFT SEAL

BACKGROUND OF THE INVENTION

The invention relates to a cassette shaft seal of the type comprising an outer ring and an inner ring of opposite angular profile which together enclose an angular chamber of substantially rectangular cross section. The outer ring is provided with at least one sealing lip lying against the inner ring and with means for loosely holding a relatively rotatable, axially projecting flange of the inner ring. A communicating gap is present between the angular chamber and the sealed space outside the shaft seal which is defined on one side by the inner ring flange.

Such a cassette seal is disclosed in the German published patent application No. 34 14 008. It does not have very satisfactory practical properties, especially at high shaft rotational speeds.

The invention is addressed to the problem of further developing a cassette seal of this type such that it will have substantially improved properties at high shaft speeds. The cassette shaft seal according to the invention is to have greatly reduced wear, and thus have an increased useful life, especially at high speeds and at changing speeds.

SUMMARY OF THE INVENTION

These objectives are achieved, according to the present invention, in a cassette seal of the type described above, by expanding the cross section of the communication gap on the side facing away from the inner ring flange by segmental cutouts in the outer ring that are uniformly distributed around the circumference of the seal. These segmental cutouts thus form passages connecting the annular chamber within the seal with the space that is to be sealed.

In the cassette seal according to the invention, the gap between the annular chamber and the sealed chamber is increased in cross section, on the side facing away from the flange, by means of segmental cutouts distributed around the circumference, so that in their area channels are established between the annular chamber and the chamber that is to be sealed off. The volume of liquid that is contained in the annular chamber, which is subjected to the action of centrifugal forces due to the rotational movement of the inner ring flange which is revolving with the shaft, is thereby not only rotated in it but to a certain extent, it is also constantly being driven out of it. Thus, under normal conditions of operation a certain under pressure develops within the annular chamber, which is constantly being compensated from the sealed-off chamber through the channels formed by the segmental cutouts of the outer ring. The liquid volume running under normal operating conditions past the sealing lip is thereby constantly replaced, thus largely preventing any undesirable heating or an accumulation of foreign matter. Also, there is no longer any danger of incrustation in the area of the sealing lip.

The effect described above is dependent upon rotational speed; i.e., it increases with any increase in the rotational speed of the shaft. Even shafts revolving at maximum speed can thus be reliably sealed by using the cassette shaft seal according to the invention.

The segment cutouts should insofar as possible have a depth that is at least twice as great as the depth of the adjacent gap between the inner ring flange and the outer ring. For normal machine construction, designs have proven especially favorable in which the segmental cutouts have a depth that is at least five times as great as the depth of the adjacent gap.

In the circumferential direction, the segmental cutouts are to have a length that is approximately equal to their distance apart. In this manner a uniform delivery of fresh, unused medium to the sealing lip on its entire circumference is thereby especially promoted.

Insofar as possible, the segmental cutouts are to be so arranged and configured that the entire volume of liquid contained in the annular chamber will be continuously replaced.

For the same purposes, rheological dead spaces must be avoided to the extent possible; this can be accomplished, for example, also by providing the segmental cutouts with a funnel-shaped mouth at the end facing the annular chamber.

To obtain a very speedy replacement of the volume contained in the annular chamber, it has been found advantageous if the surfaces defining the annular chamber in the axial direction on the flange, on the one hand, and on the outer ring, on the other, are provided at least partially with a set of guide vanes. If used on the side of the flange, the latter must have an outward pumping action in the radial direction, but on the opposite side the pumping direction must be inward. It is possible to base the pattern on known models from the art of pump construction.

The exchange of the volume of liquid contained in the annular chamber can be accelerated by providing connection openings, uniformly distributed around the circumference, parallel to the segmental cutouts. Preferably these connection openings extend axially through the inner ring flange between the sealing lip and the outer circumference. Through the connecting openings additional, fresh liquid can enter the annular chamber to replace the liquid that is leaving it through the gap.

The cassette shaft seal according to the invention is distinguished by excellent ruggedness and sturdiness and by an outstandingly long useful life. It requires no special care in installation, and therefore it can easily be used in conjunction with automatic assembling equipment.

The subject of the present invention is further explained hereinbelow in conjunction with the accompanying drawings.

DESCRIPTION OF THE PREFERRED EMBODIMENTS

Figure 1:
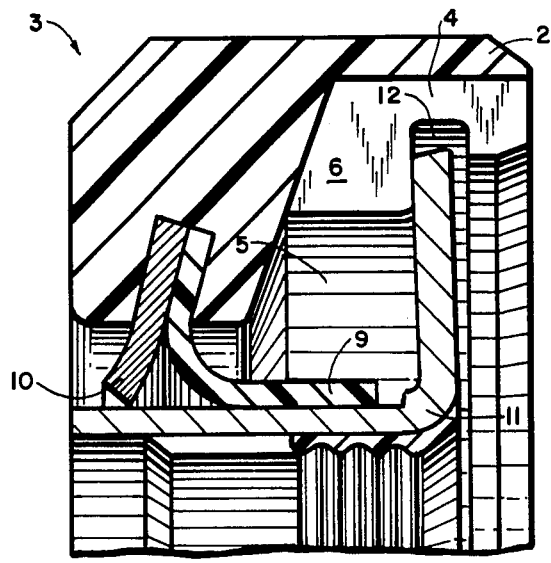
FIG. 1 is a cross-sectional diagram of a cassette shaft seal in which the outer ring is provided with a sealing lip consisting of "PTFE".
Figure 3:
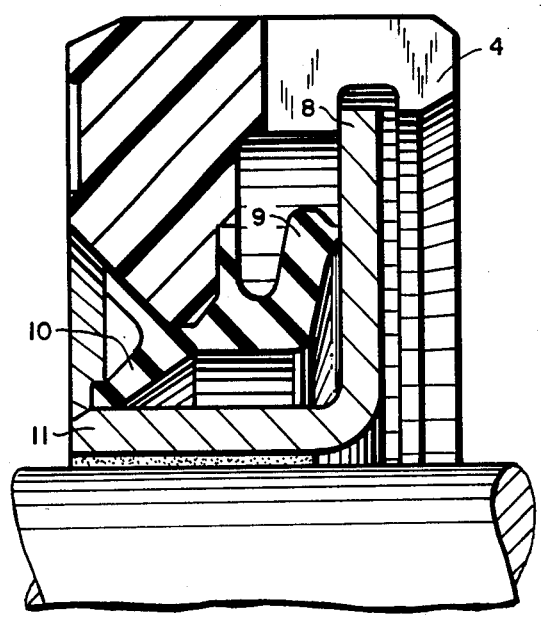
FIG. 3 is a cross-sectional diagram of a cassette shaft seal similar to that of FIG. 2, in which the outer ring is provided with a sealing lip which lies against a countersurface of the inner ring that extends in the radial direction.
Figure 4:
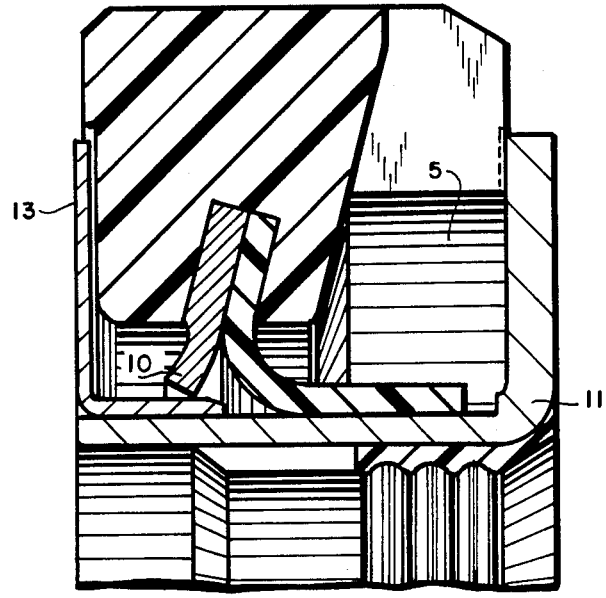
FIG. 4 is a cross-sectional diagram of a cassette shaft seal similar to that of FIG. 1, in which the outer ring is enclosed axially on both sides by radially outwardly projecting flanges of the inner ring.

The cassette shaft seal according to FIGS. 1 and 4 is provided with outer rings 3 of a polymeric material. They are formed in the liquid state on the sealing lips 9, 10 and then solidified. The sealing lips 9 are made of polytetrafluoroethylene or "PTFE" ("Teflon"). In the embodiments according to FIGS. 2 and 3, the sealing lips 9 consist of elastic material. They are formed in the liquid state on the previously formed outer rings 3 and are then solidified. In this way, in spite of the relatively complex configuration, economical manufacturing is easily possible.

In the embodiment of FIG. 1 the outer ring 3 has on the outside a continuous cylindrical surface which makes it very sturdy.

The axial section 2 of its profile, which projects toward the sealed chamber, is provided internally with a circumferential groove 12 that encloses the radially outwardly projecting flange 8 of the inner ring 11 with radial and axial clearance, but allows it to be relatively rotatable. The groove 12 is interrupted by segmental cutouts 4 distributed uniformly on the circumference, which have a greater radial depth than the groove 12. The segmental cutouts 4 are of channel-like configuration axially and are provided, on the side facing the annular chamber 5, with a funnel-like mouth 6.

The outer ring 3 and the inner ring 11 have opposite, angular profiles. Together they enclose the annular chamber 5 which is sealed in relation to the inner ring in the area of its inside circumference by the sealing lip 9, made of PTFE, in the outer ring 3. Furthermore, a dust lip 10 is provided, which is in contact, like the sealing lip 9, with the same continuous cylindrical surface of the inner rings. The dust lip 10 consists of nonwoven fabric.

If the cassette shaft seal is correctly employed, the outer ring 3 is held nonrotatably in the housing in which it is installed, and the inner ring 11 is held nonrotatably on the shaft. When a rotational movement is imparted to the shaft, the flange 8 of the inner ring 11 follows its rotational movement and, due to centrifugal force, it exerts on those parts of the liquid contained in the annular chamber 5 which are in contact with it an outwardly directed force. The volume of liquid contained in the annular chamber 5 is thereby set in counterclockwise rotation, whereby new parts of the liquid are constantly carried from the rearward region past the dynamic sealing zone of the sealing lip 9. This prevents the formation of incrustations in the sealing gap.

In addition, a certain volume of liquid constantly leaves the annular chamber 5 through the segmental cutouts 4, which results in the build-up of a certain under pressure in the segmental cutouts 4 through which fresh, unused liquid flows from the sealed chamber into the annular chamber 5. Heat build-up or the accumulation of foreign matter in the annular chamber 5 is thereby reliably prevented.

Figure 2:
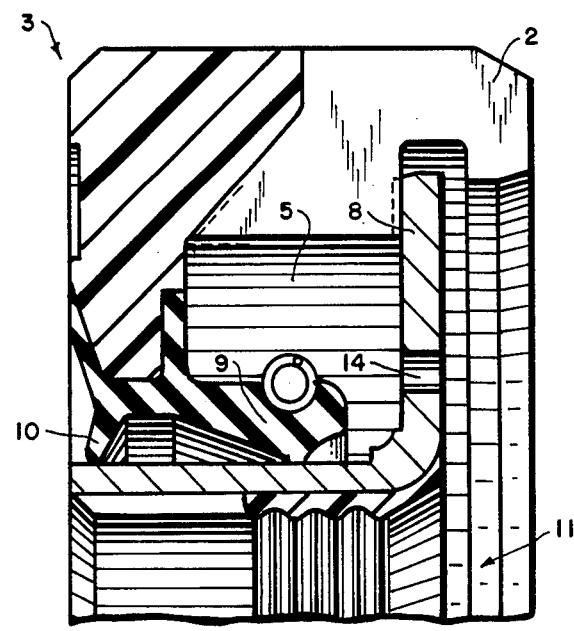
FIG. 2 is a cross-sectional diagram of a cassette shaft seal similar to that of FIG. 1, in which the outer ring is provided with a sealing lip corresponding to conventional radial shaft sealing rings.

The embodiment shown in FIG. 2 is similar functionally to the one described above. The segmental cutouts 4 of section 2 of the profile of the outer ring 3 consist in this case of complete breaks through section 2; this considerably increases the cross section of the passage through the segmental cutouts 4 which is needed for the liquid replacement in the annular chamber 5. Additional liquid can pass over into the annular chamber 5 through the bores 14 uniformly distributed around th circumference. This construction is especially suited for applications in which great stresses are to be expected. In the embodiment according to FIG. 2, the sealing lips 9 and dust lips 10 are produced integrally from rubber-elastic material. They are identical in cross-sectional configuration to the known radial shaft seals.

The embodiment shown in FIG. 3 differs from the one shown in FIG. 2 in a modification of the sealing lip 9. The latter is in contact with an axial defining surface of the flange 8, which is often desirable in special cases.

The embodiment shown in FIG. 4 is similar in design and operation to the one shown in FIG. 1. Here again the segmental cutouts are designed as complete radial breakthroughs in the section 2 of the profile of the outer ring 3, which promotes an accelerated liquid exchange in the annular chamber 5. An additional slinger ring 13 of angular profile which is joined to the inner ring 11 assures unlosable retention between the inner ring 11 and the outer ring 3 and provides additional protection against external dirt.

There has thus been shown and described a novel cassette shaft seal which fulfills all the objects and advantages sought therefor. Many changes, modifications, variations and other uses and applications of the subject invention will, however, become apparent to those skilled in the art after considering this specification and the accompanying drawings which disclose the preferred embodiment thereof. All such changes, modifications, variations and other uses and applications which do not depart from the spirit and scope of the invention are deemed to be covered by the invention which is limited only by the claims which follow.

I claim:

1. In a cassette shaft seal, comprising an outer ring and an inner ring of opposite angular profile which together enclose an annular chamber of substantially rectangular cross section, the outer ring being provided with at least one sealing lip lying against the inner ring and with a means for loosely holding a relatively rotatable, axially projecting flange of the inner ring, and a communicating gap being present between the annular chamber and the sealed space which is defined on the one side by the inner ring flange, the improvement comprising a plurality of segmental cutouts in said outer ring, on the side facing away from the flange, uniformly distributed around the circumference of the seal, said segmental cutouts forming passages between the annular chamber and the space that is to be sealed.

2. The cassette shaft seal according to claim 1, wherein said segmental cutouts have a depth that is at least twice as great as the depth of the adjacent communicating gap.

3. The cassette shaft seal according to claim 1, wherein said segmental cutouts have a length in the circumferential direction that amounts to 0.5 to 3 times their distance apart from on another.

4. The cassette shaft seal according to claim 1, wherein said segmental cutouts are provided, at their ends facing the annular chamber, with a funnel orifice.

5. The cassette shaft seal according to claim 1, wherein connecting openings uniformly distributed around the circumference are arranged in parallel with said segmental cutouts and wherein said connecting openings axially penetrate the flange between the sealing lip and the outer circumference.

* * * * *